(12) United States Patent
Noll et al.

(10) Patent No.: US 12,339,840 B2
(45) Date of Patent: Jun. 24, 2025

(54) RESULT STREAMING FOR DISTRIBUTED QUERY PROCESSING

(71) Applicant: SAP SE, Walldorf (DE)

(72) Inventors: Stefan Noll, Sandhausen (DE); Paul Willems, Heidelberg (DE)

(73) Assignee: SAP SE, Walldorf (DE)

(*) Notice: Subject to any disclaimer, the term of this patent is extended or adjusted under 35 U.S.C. 154(b) by 45 days.

(21) Appl. No.: 18/355,679

(22) Filed: Jul. 20, 2023

(65) Prior Publication Data

US 2024/0419660 A1    Dec. 19, 2024

Related U.S. Application Data

(60) Provisional application No. 63/508,263, filed on Jun. 14, 2023.

(51) Int. Cl.
| | |
|---|---|
| *G06F 16/245* | (2019.01) |
| *G06F 16/2452* | (2019.01) |
| *G06F 16/2453* | (2019.01) |
| *G06F 16/2455* | (2019.01) |
| *G06F 16/2458* | (2019.01) |

(52) U.S. Cl.
CPC .. *G06F 16/24524* (2019.01); *G06F 16/24542* (2019.01); *G06F 16/2456* (2019.01); *G06F 16/2471* (2019.01)

(58) Field of Classification Search
CPC ........... G06F 16/24524; G06F 16/2471; G06F 16/24542; G06F 16/2456
See application file for complete search history.

(56) References Cited

U.S. PATENT DOCUMENTS

2018/0072103 A1* 3/2018 Vantal ................. B60C 11/0302
2023/0376473 A1* 11/2023 Amler .................... G06F 16/221

* cited by examiner

*Primary Examiner* — Truong V Vo
(74) *Attorney, Agent, or Firm* — Mintz Levin Cohn Ferris Glovsky and Popeo, P.C.

(57) ABSTRACT

In some implementations, there is provided a method that includes detecting in a query plan a pipeline that includes a last restart query operator that can cause a retry of the query plan during execution of the query plan; configuring the pipeline to execute the pipeline using an open call configuration, configuring at least one subsequent pipeline to execute in a fetch call configuration; executing the query plan including the pipeline in the open call configuration; sending, by the send operator, a message indicating the last restart query operator cannot cause a retry of the execution of the query plan; and causing execution of at least one operator in the subsequent pipeline to execute in the fetch call configuration, in which result streaming of partial results is allowed for the at least one operator.

20 Claims, 9 Drawing Sheets

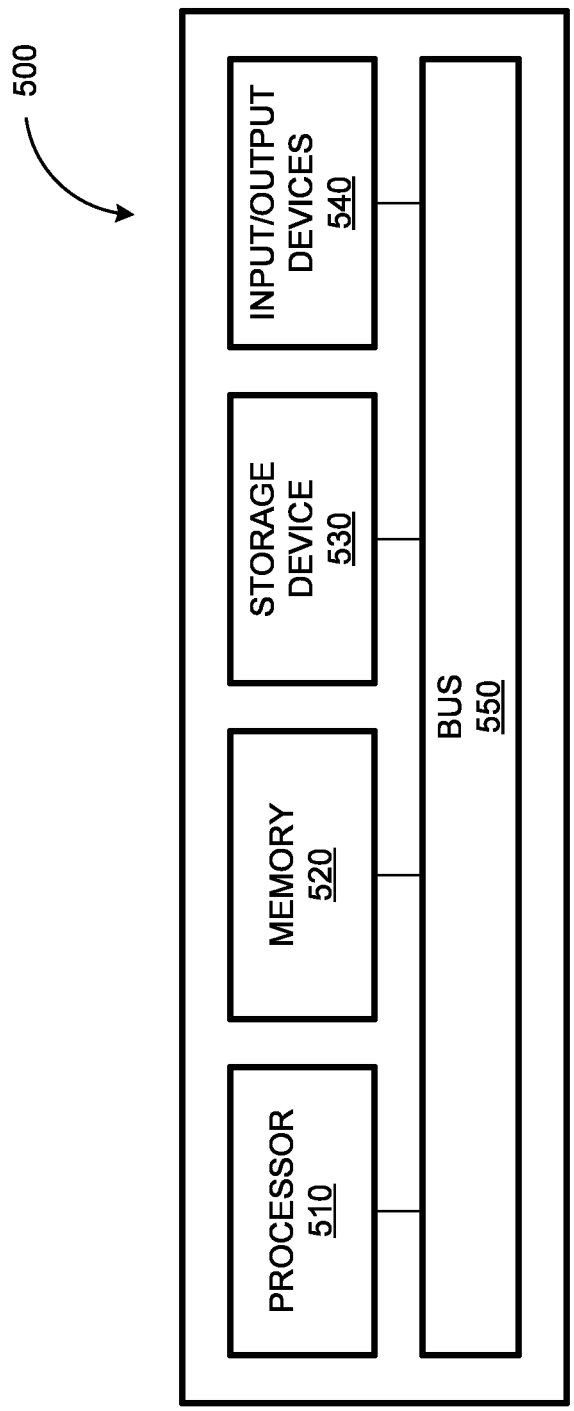

RESULT STREAMING FOR DISTRIBUTED QUERY PROCESSING

CROSS-REFERENCE TO RELATED APPLICATION

The present application claims priority to U.S. Provisional Application No. 63/508,263, filed Jun. 14, 2023, and entitled "RESULT STREAMING FOR DISTRIBUTED QUERY PROCESSING". The entire content of which is incorporated by reference in its entirety.

TECHNICAL FIELD

The subject matter described herein relates generally to database processing and more specifically to database query optimization and execution.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, may provide optimization for result streaming of queries. In some implementations, there is provided a method including detecting in a query plan a pipeline that includes a last restart query operator that can cause a retry of the query plan during execution of the query plan; in response to detecting the pipeline that includes the last restart query operator, configuring the pipeline to execute the pipeline using an open call configuration, configuring at least one subsequent pipeline to execute in a fetch call configuration, and configuring a send operator in the pipeline to send an indication when the last restart query operator is no longer able to restart execution of the query plan; executing the query plan including the pipeline in the open call configuration; in response to the last restart query operator indicating a restart is no longer possible at the last restart query operator, sending, by the send operator, a message indicating the last restart query operator cannot cause a retry of the execution of the query plan; and in response to the message, causing execution of at least one operator in the subsequent pipeline to execute in the fetch call configuration, in which result streaming of partial results is allowed for the at least one operator.

In some variations, one or more features disclosed herein including the following features can optionally be included in any feasible combination. A query for query plan generation, optimization, and execution may be received. In response to receiving the query, the query plan comprising a plurality of pipelines of operators may be generated. The retry may cause (during execution of the query plan) a restart of the execution of the query plan or a recompile and execution of the query plan. The send operator may be configured to check the last restart query operator to determine whether the last restart query operator is no longer able to restart execution of the query plan. The send operator may be configured to check for a change of a flag that indicates the last restart query operator is no longer able to restart execution of the query plan. The message may be propagated to one or more other nodes to indicate the last restart query operator cannot cause a retry of the execution of the query plan, wherein the one or more other nodes cause execution of a corresponding pipeline in the fetch call configuration, in which result streaming of partial results is allowed for the at least one operator.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 depicts a block diagram illustrating an example of a computing system, in accordance with some example embodiments.

When practical, similar reference numbers denote similar structures, features, or elements.

DETAILED DESCRIPTION

Figure 1A:
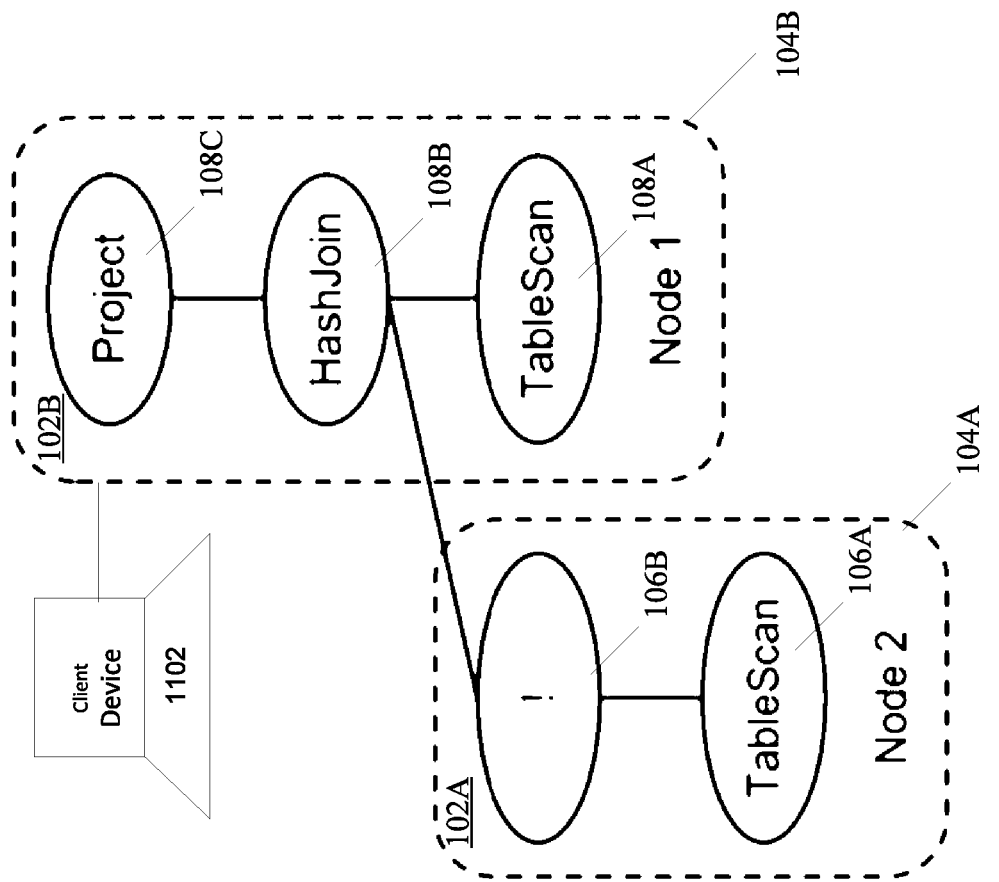
FIG. 1A depicts an example of an optimized query plan distributed across two nodes, in accordance with some implementations.

An in-memory relational database may utilize main memory for the primary storage of database tables. For example, the in-memory relational database may be implemented as a column-oriented database (or a columnar database) that stores data from database tables by columns instead of by rows. In the case of the in-memory column-oriented relational database for example, each tuple of a relation may correspond to a record occupying one row of a database table while the columns of the database table may store the values of the common attributes shared by multiple tuples, such that the values occupying each column of the database table (which may span multiple rows (or records) of the database table) may be stored sequentially in one or more data pages, with each data page storing at least a portion of a column. The in-memory column-oriented relational database may support efficient data compression and partitioning for massively parallel processing. Because the in-memory database is directly accessible by the central processing unit (CPU) of the computing engine, transactions accessing the in-memory database may be executed to provide near-instantaneous results.

The throughput and storage capacity of a database, such as an in-memory column-oriented relational database as well as other types of databases, may be maximized by distributing the processing and storage of data across multiple nodes (e.g., one or more computing node comprising at least one processor and at least one memory) to provide distributed query processing at those nodes. A single database table may for example be divided into multiple partitions (or internal tables) through one or more of hash partitioning, round-robin partitioning, and range partitioning, and stored across multiple computing nodes. Doing so may maximize opportunities for parallelization in which a single query is divided into multiple tasks and assigned to individual worker threads for parallel execution. As used herein, the term "worker thread" may refer to a thread or thread of execution, which is a sequence of instructions managed independently by a scheduler. Individual worker threads (e.g., the corresponding sequences of instructions) may be scheduled for sequential execution and/or parallel execution by one or multiple central processing units (CPUs).

In a parallelization framework, a database execution engine may divide a query accessing a dataset (e.g., including one or more database tables) into a quantity of tasks determined based on the quantity of time required to execute the query on a portion the dataset having a predetermined size. As such, if a large quantity of time is required to execute the query on the portion of the dataset, the database execution engine may determine that the query is computationally intensive and thus divide the query into a larger quantity of smaller tasks. Meanwhile, the quantity of worker threads allocated to execute the query may be determined based on the progress of the query observed at various time intervals. For instance, upon allocating an initial quantity of worker threads to perform the tasks associated with the query, the database execution engine may monitor the progress of the query (e.g., the quantity of tasks that have not been performed by any worker threads, the quantity of tasks that have been performed relative to the total quantity of outstanding tasks, and/or the like) to determine whether to increase that initial quantity of worker threads.

In addition to parallelization, the database execution engine may also implement result streaming to support use cases that do not require all of the results of a query at once. With result streaming, the database execution engine may respond to a query by generating a portion of the result, which includes sufficient data for responding to a current "fetch" call and some additional data for buffering (e.g., in main memory) in anticipation of a future fetch call. By contrast with the "fetch" call configuration, when an "open" call configuration is used, the operators of a pipeline execute to completion and cannot be paused to allow for result streaming of partial results. The worker threads allocated to generate the portion of the result may be paused in between fetch calls, for example, by allowing these worker threads to sleep on a semaphore. In the event a subsequent fetch call requires more than the buffered data, the database execution engine may wake up the paused worker threads to continue performing the remaining tasks associated with the query. Thus, result streaming may provide optimization by not requiring an operations of a query to operate on all of the data at once.

Furthermore, the database execution engine (which may also be referred to as a query execution engine or an execution engine, for short) may use pipelining. In the case of pipelining, the database execution engine breaks up chunks of data into smaller chunks of data, such that each smaller chunk of data can be processed by a series of one or more operators. The operators refer to low-level operators, such as code that performs a specific operation during operator execution rather than a high-level relational algebra operator. For example, the low-level operator may implement a lock on a database table, perform an index scan, perform a table scan at a given database, and/or the like.

The operators may be connected with each other to form a directed acyclic graph (DAG). Operators with no outgoing links may split the DAG up into multiple pipelines. For example, a pipeline ends on an operator with no outgoing links and starts with an operator after the previous pipeline ended. Moreover, pipeline execution may be performed in a recurrent fashion, such that operator "n" takes a chunk of data (also referred to as a "chunk" or "data chunk") as input, performs its operation ("n") on the input data chunk, and then operator "n" pushes its corresponding output data chunk to the next operator "n+1". After the last operator in the pipeline is done performing its operation, control is returned to a prior operator. For example, when operator n+1 is finished, execution control returns to prior operator n. The operator may (or may not) continue processing (for example, producing another data chunk and pushing the data chunk down the pipeline of operators, performing a cleanup task, freeing resources, and/or the like). In other words, the pipeline represents a set of data processing elements (e.g., operators) connected in series, such that the output of a data chunk of one element of the pipeline is the input data chunk of the next element of the pipeline, and buffer storage may be used between the elements to store the data chunk. In some instances, the elements of a pipeline can be executed in parallel or in time-sliced fashion.

As noted, the database execution engine may perform query execution by using result streaming. For example, the query execution may be divided into multiple phases (or, e.g., calls) during which the customer or client requests data produced by the query in smaller data chunks (or parts). Thus, with result streaming, query execution tries to avoid processing all of the data at once. Instead, a portion of the data is processed, so that enough data is processed to satisfy a client request or call (first response to client/customer) and if more requests are issued from the client/customer, more data is processed; but if the client/customer is only interested in only a portion of the results (e.g., a first result), data processing can stop at that point. In other words, results streaming provides partial results in response to a query from a client device.

FIG. 1A depicts an example of a first pipeline 102A that includes at least two operators a table scan operator 106A (which scans a database table) and a second operator 106B. The table scan operator 106A and the second operator 106B are executed by a second node 104A. In the example of FIG. 1A, a first node 104B executes a second pipeline 102B that include at least one operator, such as a table scan operator 108A, a hash join operator 108B, and a project operator 108C.

In the example of FIG. 1A, the first pipeline 102A and the second pipeline 102B cannot be executed by the database execution engine using result streaming. For example, the operators 106A-B and 108A-C are executed by the database execution using an open call. As used herein, when the operators of a pipeline are executed using an open call (also referred to herein as an "open call configuration") all of the operators are executed to completion without the ability to pause and resume execution of any of the operators. As such, the query plan including operators 106A-B and 108A-C executed using the open call configuration cannot take advantage of the gains obtained by result streaming.

In the example of FIG. 1A, the second operator 106B is a "retry operator" (labeled at 106B with an "!"). As used herein, the "retry operator" is an operator that during query execution can cause during execution of the query plan ("query execution plan") to restart to the beginning of the query plan (or cause the current query execution plan to be recompiled so a new query execution plan is generated). In the case of the second operator 106B being a retry operator, a retry would be problematic during query execution using result streaming. If during query plan execution for example the retry operator 106B restarts or re-compiles the query plan, any partial results generated before the retry would have to be reconciled (e.g., merged) with the post retry results. To address this challenge and/or other challenges with respect to result streaming, there is provided a way to accommodate operators that might cause a retry ("retry operator") and still support at least in part result streaming.

In some implementations, during query plan generation, the database execution engine detects a pipeline having a last "retry operator" that might cause a retry. When the pipeline having the last retry operator is detected, the database execution engine configures the detected pipeline and any preceding pipelines in an open call configuration, while any remaining, subsequent pipelines are configured in a fetch call configuration.

Next, a first send operator after the detected last retry operator in the query plan is identified and configured to not only transfer data chunks but also send a message indicating that the detected last retry operator will not be performing any more retries (e.g., a "no more retries" message). To illustrate further, the send operator may be configured to check from time to time (e.g., when the check operator is executed as part of the execution of the query plan and thus processes a corresponding data chunk as part of pipelined query plan execution) whether the "retry information" on the current retry operator has changed. This retry information may be in the form of a flag or other indicator provided by the retry operator. For example, the retry operator retry information may set a flag to indicated that the retry operator cannot cause any additional retries of the query plan during execution (e.g., because the last retry operator ran to completion or ran to some degree such that no further retries will be triggered). Alternatively, or additionally, the retry operator's retry information may change if the received retry information from another node (e.g., when the node is a receive operator) and this information was not propagated yet via the send operator.

Figure 1B:
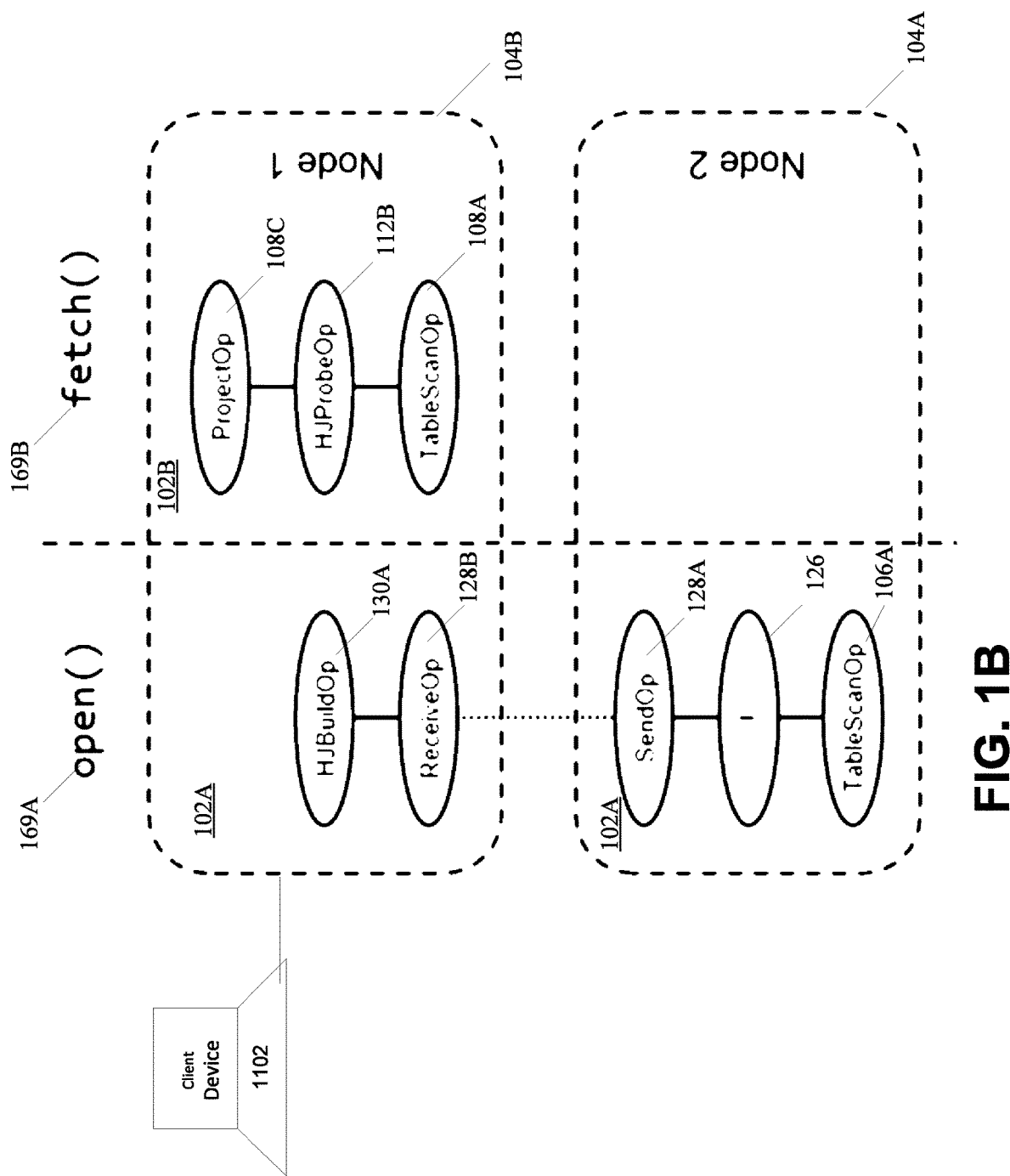
FIG. 1B depicts an example of supporting result streaming when a retry operator is present in a pipeline, in accordance with some implementations.

FIG. 1B depicts an example of a query plan including a last retry operator 126, a send operator 128A, and a receive operator 128B. In the example of FIG. 1B, the database execution engine detects the pipeline 102A as having a last "retry operator" 126 that might cause a retry of the query plan during execution. As such, the pipeline 102A is configured to execute in the open call configuration, and the subsequent, remaining pipeline 102B is executed in the fetch call configuration. The database execution engine also identifies the first send operator 128A after the detected last retry operator in the query plan. The first send operator 128A (which may already be configured to transfer one or more data chunks) may be further configured (e.g., instructed, modified, etc.) to indicate with a message during query plan execution when the last retry operator 126 will no longer cause a retry of the execution of the query plan. In the example of FIG. 1B, the first pipeline 102A (which is executed at least in part at the second node 104A) includes a table scan operator 106A, followed by the retry operator 126, followed by the send operator 128A, and the first pipeline further includes for execution at the second node 102B, the receive operator 126B and a hash join build up operator 130A. During query plan generation, the database execution engine configures the query plan for execution such that the first pipeline is executed, as noted, in the open call configuration, and in response to a message (e.g., no more retries) from the send operator 128A, the second pipeline 102B is configured in a fetch call configuration.

After the database execution engine configures the query plan as noted above with respect to FIG. 1B, during query plan execution, the database execution engine executes query execution plan including the first pipeline 102A. This pipeline 102A includes the table scan operator 106A that pushes at least one data chunk to the retry operator 126. When the retry operator can no longer cause a retry, the retry operator may indicate that it can no longer cause a retry by setting a flag for example. The send operator 128A checks the retry operator's flag (which indicates that the retry operator can no longer cause a retry) and then sends a message (e.g., no more retries) to the receive operator 128B and hash join buildup operator 130A (which holds or buffers the at least one data chunk). This message (which may be sent along with the output data of the retry operator) indicates that retry operator can no longer cause a retry. In response to this message, the database execution engine switches (or continues with) execution of any subsequent pipelines, such as the pipeline 102B, in the fetch call configuration, so result streaming of partial results can take place for the second pipeline 102B including subsequent operators 108A, 112B, 108C, and so forth. In this way, the database execution engine executes the query plan such at least a portion (e.g., second pipeline 102B including subsequent operators 108A, 112B, 108C, and so forth) of the query plan's execution uses the fetch and result streaming.

As noted above, the database execution engine detects a last retry operator in a pipeline that might cause a retry. There can be additional retry operators executed before retry operator 126 (e.g., additional retry operators before retry operator 126 in pipeline 102A or in a prior pipeline if present). But the database execution engine does not care about prior retry operators and seeks to detect (e.g., identify) the last retry operator and its corresponding detected pipeline that can cause a retry of the query plan execution and configures the detected pipeline 102A having the last retry operator 126 with an open call (and any previous pipelines with an open call) and any subsequent pipelines such as pipeline 102B with a fetch call to enable the result streaming of partial results. And, the database execution engine configures, as noted, the send operator 128A to send a message to check the last retry operator 126 and indicate during query plan execution when the last retry operator cannot cause another retry.

In the example of FIG. 1B, node 1 is referred to as a "root" node as it returns results (which in the case of result streaming are partial results) to a client device, such as client device 1102. In the example of FIG. 1B, node 1 104B does not have knowledge regarding the retry operator 126 at the node 2 104A, so the message sent from the send operator 128A to the receive operator 128B informs node 1 that the retry operator will no longer cause a retry of the query plan execution and, as such, the operator execution may transition from open to fetch at the second pipeline 102B at the second node 104B.

Before providing additional description regarding the handling of retry operators, the following provides an examples of system environments.

Figure 2A:
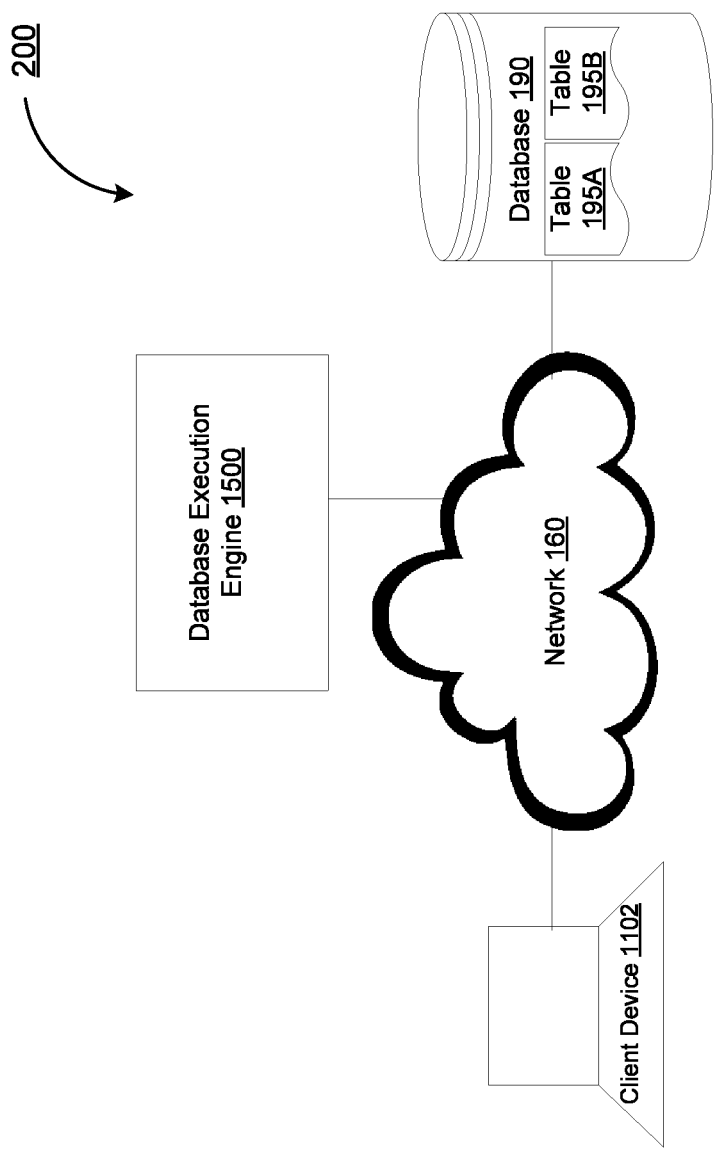
FIGS. 2A and 2B depict examples of systems including a database execution engine, in accordance with some example embodiments.

FIG. 2A depicts a system diagram illustrating an example of a database system 200, in accordance with some example embodiments. Referring to FIG. 2A, the database system 200 may include one or more client devices such as client device 102, a database execution engine 1500, and one or more databases, such as database 190 that further includes one or more tables such as database tables 195A-B. As shown in FIG. 2, the one or more client devices 1102, the database execution engine 1500, and the one or more databases 190 may be communicative coupled via a network 160.

The one or more databases 190 may include a variety of relational database technologies including, for example, an in-memory database, a column-based database, a row-based database, hybrid database (e.g., combination of column and row based), and/or the like. The one or more client devices 1102 may include processor-based devices including, for example, a mobile device, a wearable apparatus, a personal computer, a workstation, an Internet-of-Things (IoT) appliance, and/or the like. The network 160 may be a wired network and/or wireless network including, for example, a public land mobile network (PLMN), a local area network (LAN), a virtual local area network (VLAN), a wide area network (WAN), the Internet, and/or the like.

Figure 2B:
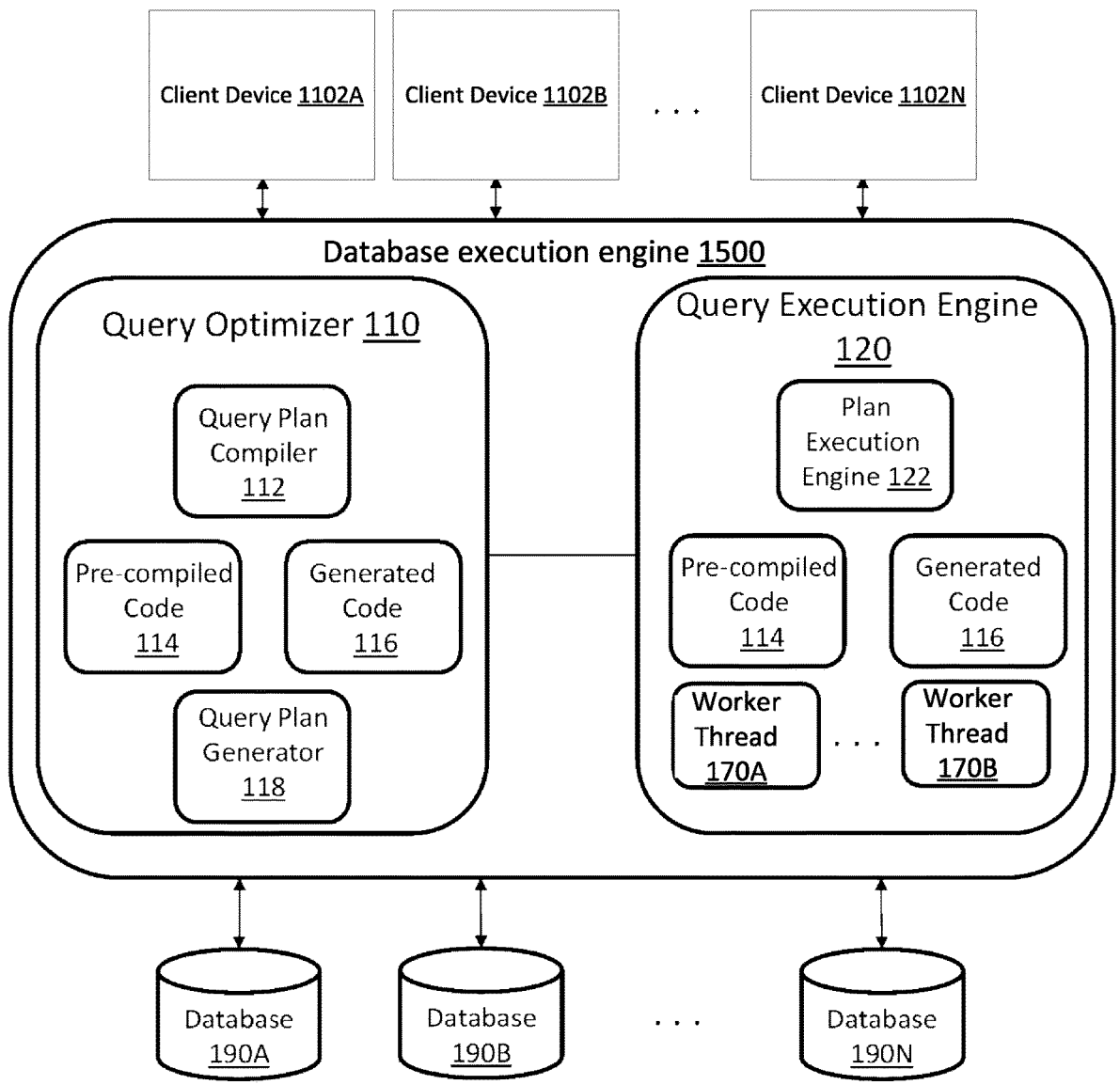

FIG. 2B depicts another block diagram illustrating an example of the database execution engine 1500, in accordance with some example embodiments. As shown in FIG. 2, the one or more databases 190, which may include a first database 190A, a second database 190B, and a third database 190C, can represent the database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102, which may include the client devices (e.g., user equipment) 1102A-N, may send a query via the database execution engine 1500 to the database layer including the one or more databases 190, which may represent a persistence and/or storage layer where database tables may be stored and/or queried. The query may be sent via a connection, such as a wired connection and/or wireless connection (e.g., the Internet, cellular links, WiFi links, and/or the like) provided, for example, by the network 160. Although FIG. 2B depicts the execution engine as separate from the databases 190A-N, a database may include a database execution engine as well.

The database execution engine 1500 may include a query optimizer 110, such as a SQL optimizer and/or another type of optimizer, to receive at least one query from the one or more client devices 1102A-N and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra." The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190.

In some embodiments, the query optimizer 110 may optimize a query plan using pipeline reordering, such that certain pipelines (which include one or more restart pipelines and one or more results streaming pipelines) are reordered so that the partial data results benefits of the results streamlining can be realized (and thus not be eliminated by a query restart in a restart pipeline).

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

The query optimizer 110 may optimize the query plan (which may include the noted pipelines of operators) by compiling and generating code. Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The pre-compiled code 114 and/or the generated code 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 1500 and sending some of the operations (or commands in support of an operation, such as a read, write, and/or the like) for execution at one or more of one or more database 190A-N.

The query execution engine 120 may, as noted, be configured to handle different types of databases and the corresponding persistent layers and/or tables therein. For example, the one or more databases 190 may include at least one row-oriented database, in which case an insert is performed by adding a row with a corresponding row identifier. Alternatively and/or additionally, where the one or more databases 190A-N include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190A-N. Moreover, the query execution engine 120 may perform other operations including rule-based operations, such as joins and projections, as well as filtering, group by, multidimensional analysis, and/or the like to reduce the processing burden on the database layer. In this way, the query execution engine 120 may execute these and other complex operations, while the one or more databases 190A-N can perform simpler operations to reduce the processing burden at the one or more databases 190A-N.

The query execution engine 120 may run, as noted above, the generated code 116 generated for some query operations, while the pre-compiled code 114 may be run for other operations. Moreover, the query execution engine 120 may combine the generated code 116 with the pre-compiled code 114 to optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

The database layer may provide distributed data storage in which the processing and storage of data is distributed across multiple nodes including, for example, the first database 190A, the second database 190B, the third database 190C, and/or the like. Accordingly, to store a database table 195 at the one or more databases 190, the database execution engine 150 may divide the database table 195 into multiple partitions by applying one or more of a hash partitioning, round-robin partitioning, and range partitioning.

To execute a query accessing a dataset that includes, for example, the database table 195A and/or B, the database execution engine 1500 may divide the query into a quantity of tasks determined based on the quantity of time required to execute the query on a portion the dataset having a predetermined size. Accordingly, if a large quantity of time is required to execute the query on the portion of the dataset, the database execution engine 150 may determine that the query is computationally intensive and thus divide the query into a larger quantity of smaller tasks (or operators). One or more of the worker threads (e.g., a first worker thread, a second worker thread, and/or the like) may be allocated to perform the tasks associated with the query.

As noted, the database execution engine 1500 may also implement result streaming to support use cases that do not require all of the results of a query at once. With result streaming, the database execution engine 150 may respond to a query by generating a portion of the result that includes sufficient data for responding to the current fetch call and some additional data for buffering (e.g., in main memory) in anticipation of a future fetch call. The one or more worker threads allocated to generate the portion of the result may be paused in between fetch calls, for example, by allowing the one or more worker threads to complete their respective tasks before going to sleep on a semaphore. Upon receiving a subsequent fetch call that requires more than the buffered data, the database execution engine 150 may wake up the paused worker threads to continue performing the remaining tasks associated with the query. As used herein, the term "fetch" or "fetch call" may refer to a particular type of request that form a part of a query requesting data from the one or more databases. For example, the database execution engine 1500 may receive, from the client device, an open request to initiate the query. Following the initial open request, the database execution engine may receive one or more subsequent fetch calls, each of which requesting at least a portion of the results of the query. That is, a single fetch call may request, from the database execution engine, at least a portion of the results associated with the query. The database execution engine may continue to receive fetch calls until the client device sends a request to close the query, which may occur when some or all of the results of the query are provided to the client device. In other words, the fetch call is a type of call where multiple fetches can be used to support the partial results of result streaming.

Although the database execution engine 1500 may realize significant savings in computational resources (e.g., memory and processor power consumption) by implementing result streaming such that the results of a query are generated on a piecemeal and as-needed basis, those savings may be negated (as noted above) if a query restarts (e.g., due to a retry operator).

Examples of retry operators that can cause a retry include: an operator that takes or performs locks a table, such as table 195A, being scanned (e.g., read); an operator that performs a dictionary scans and retrieves index results to enable a table scan of a table, such as the table 195A being scanned (e.g., read); an operator that gathers output estimations for filter predicate; an operator that performs an actual scan and produces the results of a table scan of the table, such as the table 195A being scanned (e.g., read), and/or any other operator that can or might cause a restart of a query plan during execution. Alternatively, or additionally, a query operator may cause a restart when a feature is missing and/or, if the performance of the database execution engine is known to be bad (e.g., by the database execution engine or a query optimizer). Alternatively, or additionally, a query restart may be used in a query execution plan (or query plan for short) if the query execution plan is optimized for a specific data property for example, but the data property has changed so the query should be recompiled to use a different query plan. The database execution engine (or query optimizer) may detect these and other types of retry operators in a query plan and (in response) configure the query plan with the open, fetch, and/or send operator as noted above with respect to FIG. 1B.

Figure 3:
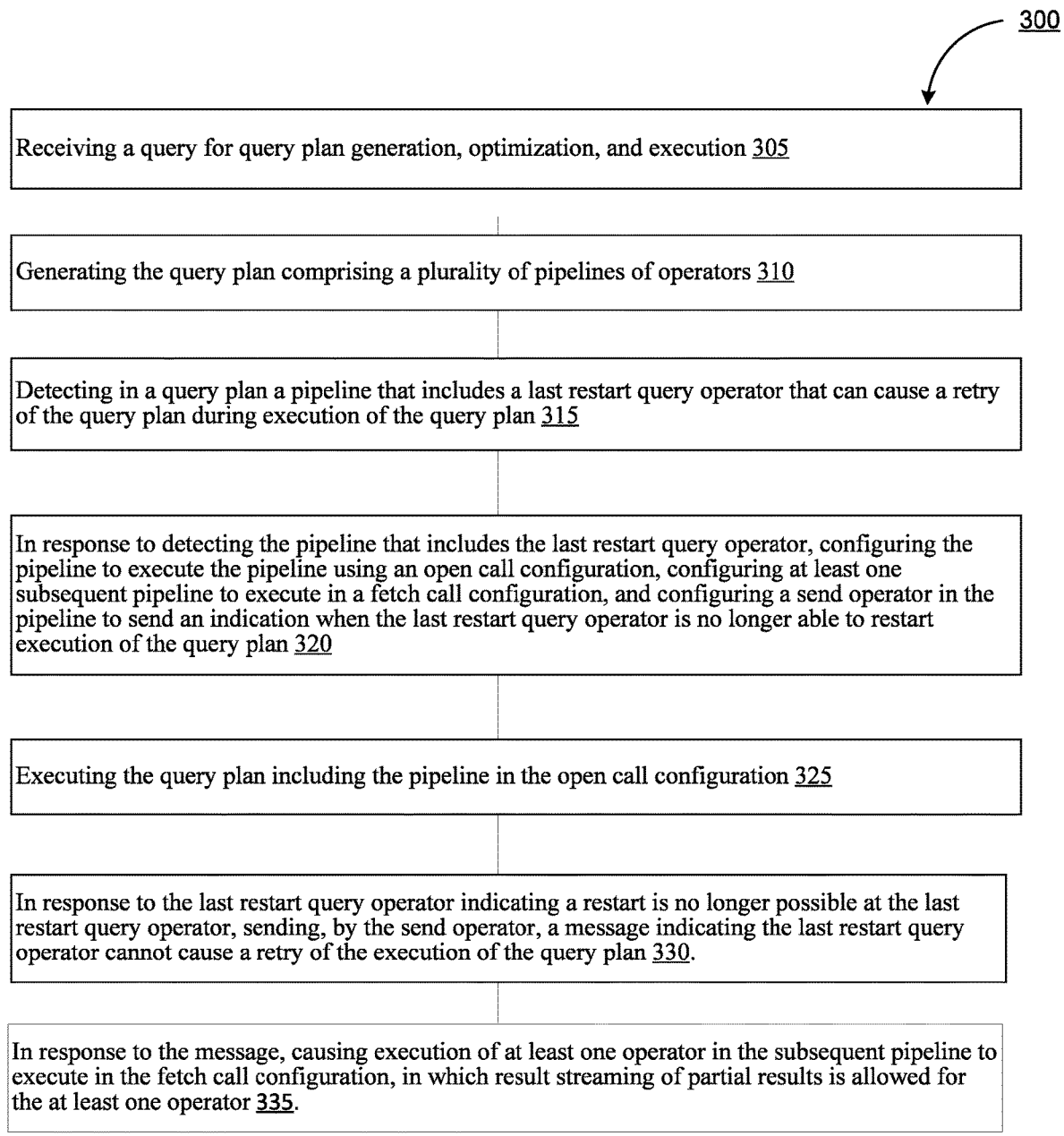
FIG. 3 depicts an example of a process flow for supporting result streaming when a retry operator is present in a pipeline, in accordance with some example embodiments.

FIG. 3 depicts, an example of a process for enable result streaming in distributed query processing when a pipeline includes a retry operator, in accordance with some implementations.

At 305, a query may be received at a database execution engine. For example, the database execution engine 1500 may receive a query from a client device, such as client user equipment 102A. As used herein, a database execution engine may refer to at least one processor and at least one memory configured with instructions to provide one or more of the aspects disclosed herein with respect to the database execution engine (e.g., receive a query, generate a query plan, optimize a query plan, and/or execute a query execution plan (or portion thereof).

At 310, the database execution engine generates a query plan including a plurality of pipelines of operators. For example, the received query may be cause the generation of the query plan. In response to the received query, the database execution engine may generate a query plan of operators as shown at FIG. 1B. In the example of FIG. 1B, the query plan includes a plurality of operators, such as the table scan operator 106B and so forth. Moreover, the operators may be executed in a distributed query processing environment using a first node 104A and a second node 104B. And, the operators may be organized into a plurality of pipelines including the pipelines 102A and 102B.

At 315, the database execution engine may detect in the query plan a pipeline that includes a last restart query operator that can cause a retry of the query plan during execution of the query plan. For example, the database execution engine 1500 may scan the query plan and detect that the query plan identifies a last operator in the query plan that can cause a query restart. This last operator is referred to as the "last restart query operator." The database execution engine also identifies the pipeline where the last restart query operator will be executed. Referring to FIG. 1B for example, the database execution engine 1500 may scan the query plan and detects the retry operator 126 as a last operator in the query plan that can cause a query restart and identifies the pipeline 102A where the last restart query operator will be executed.

At 320, in response to detecting the pipeline that includes the last restart query operator, the pipeline is configured to execute using an open call configuration, at least one subsequent pipeline is configured to execute in a fetch call configuration, and a send operator in the pipeline is configured to send an indication when the last restart query operator is no longer able to restart execution of the query plan. For example, the database execution engine 1500 detects as the last restart query operator, such as the retry operator 126 in the pipeline 102A. In response, the database execution engine configures the pipeline 102A to execute using an open 169A call configuration, configures the at least one subsequent pipeline such as the second pipeline 102B to execute in a fetch 169B call configuration, and configures the send operator 128A to send an indication, such as a no more retries message, when the last restart query operator is no longer able to restart execution of the query plan. The database execution engine 1500 may also configure the send operator to check a flag at the retry operator 126, where the flag indicates to the send operator 128A when the retry operator 126 is no longer able to cause a retry of the query plan.

At 325, the query plan including the first pipeline in the open call configuration may be executed. During query plan execution, the database execution engine 1500 may use an open call to call the pipeline 102A and execute the operators of that pipeline, such as the table scan operator 106A, retry operator 126, send operator 128A, and so forth.

At 330, in response to the last restart query operator indicating a restart is no longer possible at the last restart query operator, the send operator may send a message indicating the last restart query operator cannot cause a retry of the execution of the query plan. For example, when the retry operator can no longer cause a retry of the execution of the query plan (e.g., where a retry causes the query plan to restart or re-compile and re-execute), the retry operator provides retry information, such as a flag, indicating the retry operator can no longer cause a retry. As the send operator 128A is configured to check on the retry operator's ability to retry, the send operator detects the change at the flag and indicating the retry operator can no longer trigger a retry. The send operator may then send a message indicating the retry operator can no longer cause the retry.

At 335, in response to the message, at least one operator in the subsequent pipeline is caused to be executed in the fetch call configuration, in which result streaming of partial results is allowed for the at least one operator. For example, the message sent by the send operator may be received by the receive operator 128B. When this is the case, the database execution engine at the second node 104B causes execution of the subsequent pipeline 102B using a fetch 169 call, so the pipeline 102B including the table scan operator 108A, hash join probe operator 112B, and projection operator 108C are executed using a fetch call, which can pause to allow result streaming of partial results.

The retry information sent by the send operator may be sent carried by other operators, pipelines, and/or nodes. FIG. 4C depicts a simple example including a node C 490C, a node B 490B, and a node A 490A. In the example of FIG. 4C, chunks of data are pushed via pipelines from the node C 490C to the node B 490B to the node A 490A. In this example, only node C contains a retry operator, such as retry operator 126, so the send operator 128A is configured to send a no more retry message to a receive operator 128B at node B when the retry operator can no longer cause a retry. During pipeline execution at node B, a send operator 492C (which sends data to node A) may detect that the receive operator 128B at node B received the no more retry message from node C. When this is the case, the send operator 492 forwards the no more retry message to node A (e.g., the receive op 494A). As such, the propagated message allows nodes B and C to execute their corresponding pipelines in the fetch call configuration, so result streaming of partial results can be used.

In the case of result streaming in a distributed query processing environment across a plurality of nodes, TCP flow control may be used for the pause and resume threads.

Figure 4A:
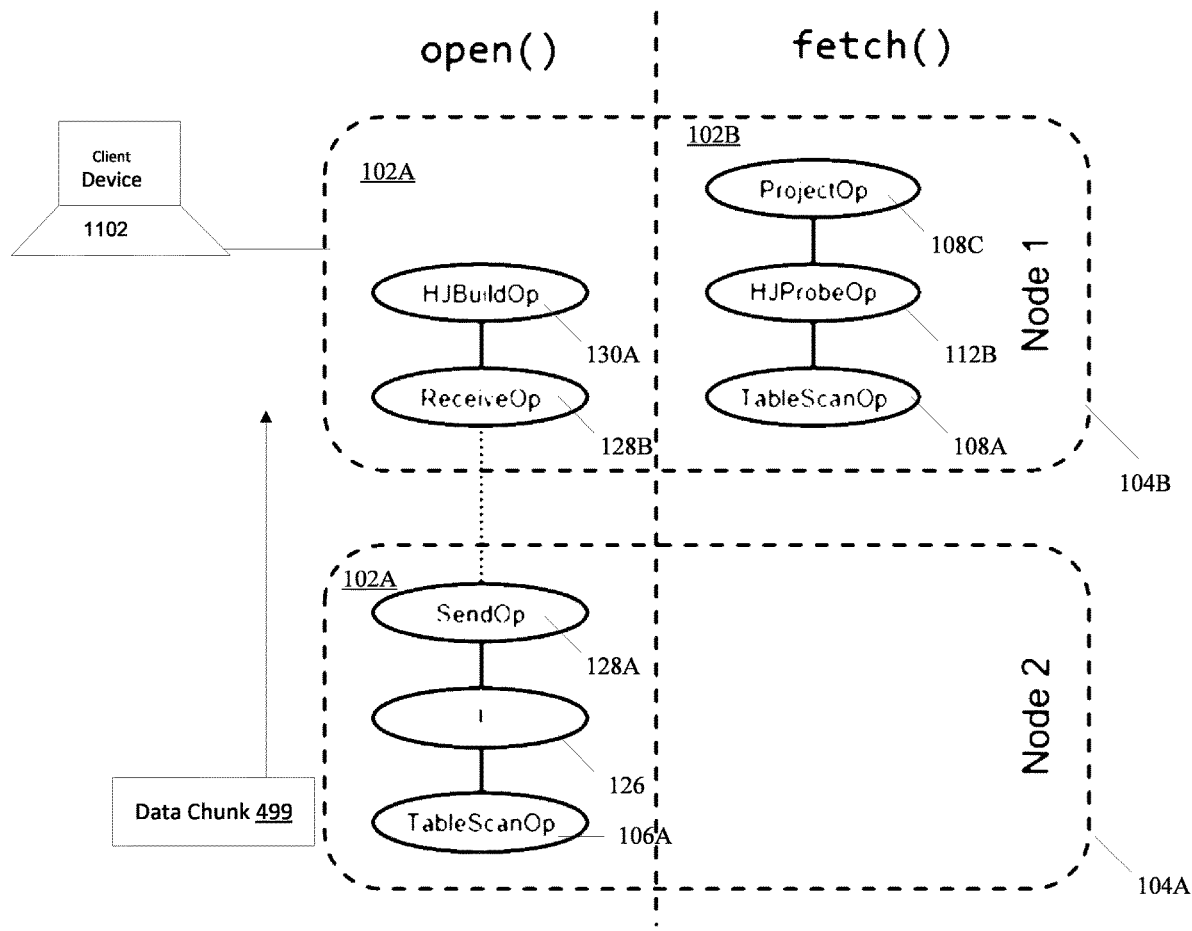
FIGS. 4A, 4B, and 4C depict examples of supporting result streaming when a retry operator is present in a pipeline, in accordance with some implementations.
Figure 4B:
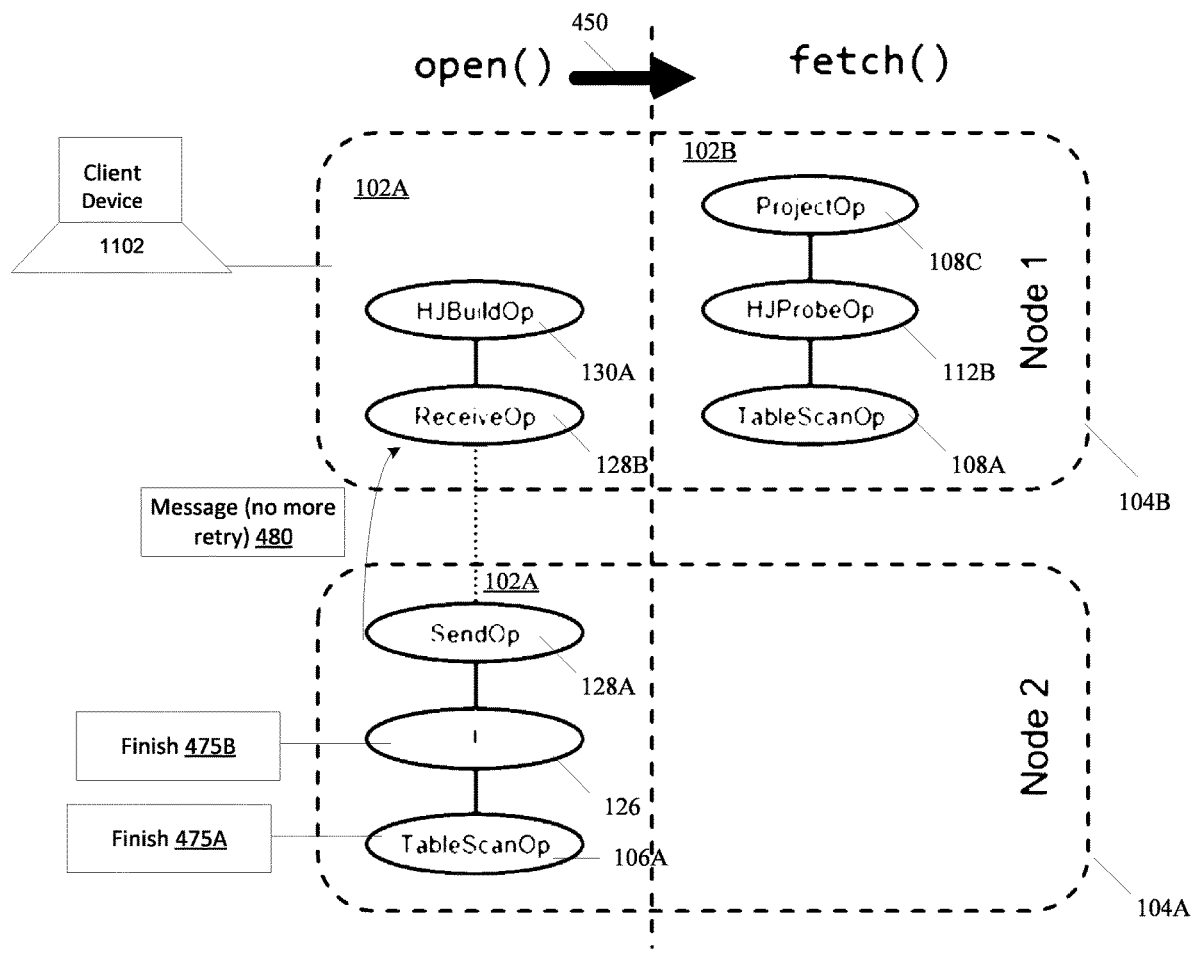
Figure 4C:
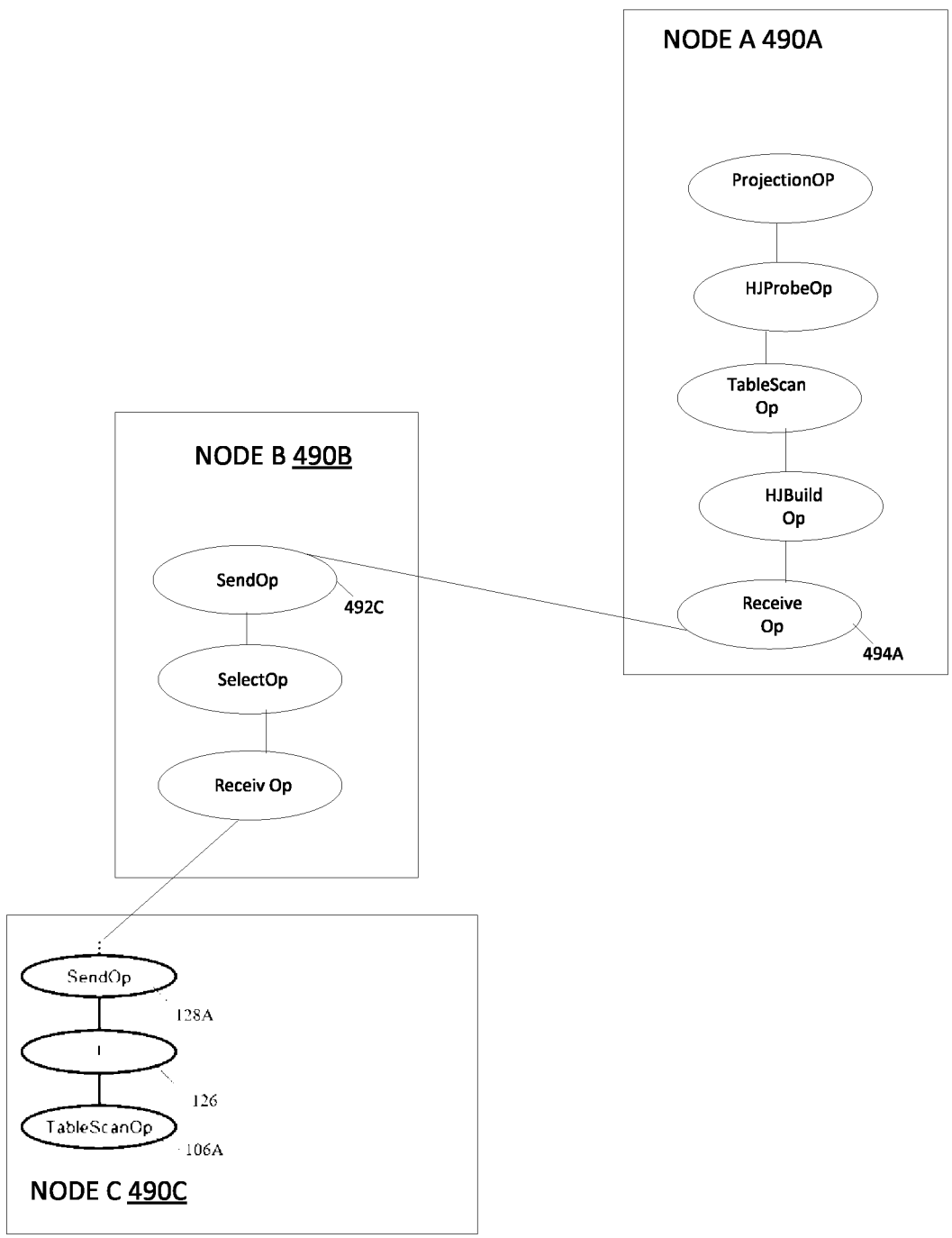

FIG. 4A and FIG. 4B depict the example pipelines of FIG. 1B. FIG. 4A further shows a data chunk 499 being generated by the table scan operator 106A and provided as an input to the retry operator 126, which processes the data chunk and generates an output data chunk (which is forwarded to the next operator). As noted, the execution is performed in an open so there is no result streaming. When the table scan operator is done scanning the table (as shown at FIG. 4B with the finish 475A), the retry operator will complete its corresponding processing (as shown at FIG. 4B with the finish 475B). The send operator 128A sends a message (e.g., no more retry) to indicate to the receive operator 128B that the last retry operator 126 can no longer cause a retry of the query plan. In response, the database execution engine transitions operator execution at 450 to fetch.

FIG. 5 depicts a block diagram illustrating an example of a computing system 500 consistent with implementations of the current subject matter. The computing system 500 may implement the database execution engine 1500 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database execution engine 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A method comprising:
detecting in a query plan a pipeline that includes a last restart query operator that can cause a retry of the query plan during execution of the query plan;
in response to detecting the pipeline that includes the last restart query operator, configuring the pipeline to execute the pipeline using an open call configuration, configuring at least one subsequent pipeline to execute in a fetch call configuration, and configuring a send operator in the pipeline to send an indication when the last restart query operator is no longer able to restart execution of the query plan;
executing the query plan including the pipeline in the open call configuration;
in response to the last restart query operator indicating a restart is no longer possible at the last restart query operator, sending, by the send operator, a message indicating the last restart query operator cannot cause a retry of the execution of the query plan; and
in response to the message, causing execution of at least one operator in the subsequent pipeline to execute in the fetch call configuration, in which result streaming of partial results is allowed for the at least one operator.

Example 2: The method of Example 1 further comprising: receiving a query for query plan generation, optimization, and execution.

Example 3: The method of any of Examples 1-2 further comprising: in response to receiving the query, generating the query plan comprising a plurality of pipelines of operators.

Example 4: The method of any of Examples 1-3, wherein the retry causes during execution of the query plan a restart of the execution of the query plan or a recompile and execution of the query plan.

Example 5: The method of any of Examples 1-4, wherein the send operator is configured to check the last restart query operator to determine whether the last restart query operator is no longer able to restart execution of the query plan.

Example 6: The method of any of Examples 1-5, wherein the send operator is configured to check for a change of a flag that indicates the last restart query operator is no longer able to restart execution of the query plan.

Example 7: The method of any of Examples 1-6, wherein the message is propagated to one or more other nodes to indicate the last restart query operator cannot cause a retry of the execution of the query plan, wherein the one or more other nodes cause execution of a corresponding pipeline in the fetch call configuration, in which result streaming of partial results is allowed for the at least one operator.

Example 8: A system comprising:
at least one processor; and
at least one memory including instructions which when executed by the at least one processor causes operations comprising:
detecting in a query plan a pipeline that includes a last restart query operator that can cause a retry of the query plan during execution of the query plan;
in response to detecting the pipeline that includes the last restart query operator, configuring the pipeline to execute the pipeline using an open call configuration, configuring at least one subsequent pipeline to execute in a fetch call configuration, and configuring a send operator in the pipeline to send an indication when the last restart query operator is no longer able to restart execution of the query plan;
executing the query plan including the pipeline in the open call configuration;
in response to the last restart query operator indicating a restart is no longer possible at the last restart query operator, sending, by the send operator, a message indicating the last restart query operator cannot cause a retry of the execution of the query plan; and
in response to the message, causing execution of at least one operator in the subsequent pipeline to execute in the fetch call configuration, in which result streaming of partial results is allowed for the at least one operator.

Example 9: The system of Example 8 further comprising: receiving a query for query plan generation, optimization, and execution.

Example 10: The system of any of Examples 8-9 further comprising: in response to receiving the query, generating the query plan comprising a plurality of pipelines of operators.

Example 11: The system of any of Examples 8-10, wherein the retry causes during execution of the query plan a restart of the execution of the query plan or a recompile and execution of the query plan.

Example 12: The system of any of Examples 8-11 wherein the send operator is configured to check the last restart query operator to determine whether the last restart query operator is no longer able to restart execution of the query plan.

Example 13: The system of any of Examples 8-12, wherein the send operator is configured to check for a change of a flag that indicates the last restart query operator is no longer able to restart execution of the query plan.

Example 14: The system of any of Examples 8-13, wherein the message is propagated to one or more other nodes to indicate the last restart query operator cannot cause a retry of the execution of the query plan, wherein the one or more other nodes cause execution of a corresponding pipeline in the fetch call configuration, in which result streaming of partial results is allowed for the at least one operator.

Example 15: A non-transitory computer-readable medium including instructions which when executed by at least one processor causes operations comprising:
detecting in a query plan a pipeline that includes a last restart query operator that can cause a retry of the query plan during execution of the query plan;
in response to detecting the pipeline that includes the last restart query operator, configuring the pipeline to execute the pipeline using an open call configuration, configuring at least one subsequent pipeline to execute in a fetch call configuration, and configuring a send operator in the pipeline to send an indication when the last restart query operator is no longer able to restart execution of the query plan;

executing the query plan including the pipeline in the open call configuration;

in response to the last restart query operator indicating a restart is no longer possible at the last restart query operator, sending, by the send operator, a message indicating the last restart query operator cannot cause a retry of the execution of the query plan; and in response to the message, causing execution of at least one operator in the subsequent pipeline to execute in the fetch call configuration, in which result streaming of partial results is allowed for the at least one operator.

Example 16: The non-transitory computer-readable medium of Example 15 further comprising: receiving a query for query plan generation, optimization, and execution.

Example 17: The non-transitory computer-readable medium of any of Examples 15-16 further comprising: in response to receiving the query, generating the query plan comprising a plurality of pipelines of operators.

Example 18: The non-transitory computer-readable medium of any of Examples 15-17, wherein the retry causes during execution of the query plan a restart of the execution of the query plan or a recompile and execution of the query plan.

Example 19: The non-transitory computer-readable medium of any of Examples 15-18, wherein the send operator is configured to check the last restart query operator to determine whether the last restart query operator is no longer able to restart execution of the query plan.

Example 20: The non-transitory computer-readable medium of any of Examples 15-19, wherein the send operator is configured to check for a change of a flag that indicates the last restart query operator is no longer able to restart execution of the query plan.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   detecting in a query plan a pipeline that includes a last restart query operator that can cause a retry of the query plan during execution of the query plan;
   in response to detecting the pipeline that includes the last restart query operator, configuring the pipeline to execute the pipeline using an open call configuration, configuring at least one subsequent pipeline to execute in a fetch call configuration, and configuring a send operator in the pipeline to send an indication when the last restart query operator is no longer able to restart execution of the query plan;
   executing the query plan including the pipeline in the open call configuration;
   in response to the last restart query operator indicating a restart is no longer possible at the last restart query operator, sending, by the send operator, a message indicating the last restart query operator cannot cause a retry of the execution of the query plan; and
   in response to the message, causing execution of at least one operator in the subsequent pipeline to execute in the fetch call configuration, in which the at least one operator in the subsequent pipeline is configured to pause after a fetch call to allow result streaming of partial results for the at least one operator.

2. The method of claim 1, further comprising:
   receiving a query for query plan generation, optimization, and execution.

3. The method of claim 2, further comprising:
   in response to receiving the query, generating the query plan comprising a plurality of pipelines of operators.

4. The method of claim 1, wherein the retry causes during execution of the query plan a restart of the execution of the query plan or a recompile and execution of the query plan.

5. The method of claim 1, wherein the send operator is configured to check the last restart query operator to determine whether the last restart query operator is no longer able to restart execution of the query plan.

6. The method of claim 5, wherein the send operator is configured to check for a change of a flag that indicates the last restart query operator is no longer able to restart execution of the query plan.

7. The method of claim 1, wherein the message is propagated to one or more other nodes to indicate the last restart query operator cannot cause a retry of the execution of the query plan, wherein the one or more other nodes cause execution of a corresponding pipeline in the fetch call configuration, in which result streaming of partial results is allowed for the at least one operator.

8. A system comprising:
   at least one processor; and
   at least one memory including instructions which when executed by the at least one processor causes operations comprising:
      detecting in a query plan a pipeline that includes a last restart query operator that can cause a retry of the query plan during execution of the query plan;
      in response to detecting the pipeline that includes the last restart query operator, configuring the pipeline to execute the pipeline using an open call configuration, configuring at least one subsequent pipeline to execute in a fetch call configuration, and configuring a send operator in the pipeline to send an indication when the last restart query operator is no longer able to restart execution of the query plan;
      executing the query plan including the pipeline in the open call configuration;
      in response to the last restart query operator indicating a restart is no longer possible at the last restart query operator, sending, by the send operator, a message indicating the last restart query operator cannot cause a retry of the execution of the query plan; and
      in response to the message, causing execution of at least one operator in the subsequent pipeline to execute in the fetch call configuration, in which the at least one operator in the subsequent pipeline is configured to pause after a fetch call to allow result streaming of partial results for the at least one operator.

9. The system of claim 8, further comprising:
receiving a query for query plan generation, optimization, and execution.

10. The system of claim 9, further comprising:
in response to receiving the query, generating the query plan comprising a plurality of pipelines of operators.

11. The system of claim 8, wherein the retry causes during execution of the query plan a restart of the execution of the query plan or a recompile and execution of the query plan.

12. The system of claim 8, wherein the send operator is configured to check the last restart query operator to determine whether the last restart query operator is no longer able to restart execution of the query plan.

13. The system of claim 12, wherein the send operator is configured to check for a change of a flag that indicates the last restart query operator is no longer able to restart execution of the query plan.

14. The system of claim 8, wherein the message is propagated to one or more other nodes to indicate the last restart query operator cannot cause a retry of the execution of the query plan, wherein the one or more other nodes cause execution of a corresponding pipeline in the fetch call configuration, in which result streaming of partial results is allowed for the at least one operator.

15. A non-transitory computer-readable medium including instructions which when executed by at least one processor causes operations comprising:
detecting in a query plan a pipeline that includes a last restart query operator that can cause a retry of the query plan during execution of the query plan;
in response to detecting the pipeline that includes the last restart query operator, configuring the pipeline to execute the pipeline using an open call configuration, configuring at least one subsequent pipeline to execute in a fetch call configuration, and configuring a send operator in the pipeline to send an indication when the last restart query operator is no longer able to restart execution of the query plan;
executing the query plan including the pipeline in the open call configuration;
in response to the last restart query operator indicating a restart is no longer possible at the last restart query operator, sending, by the send operator, a message indicating the last restart query operator cannot cause a retry of the execution of the query plan; and
in response to the message, causing execution of at least one operator in the subsequent pipeline to execute in the fetch call configuration, in which the at least one operator in the subsequent pipeline is configured to pause after a fetch call to allow result streaming of partial results for the at least one operator.

16. The non-transitory computer-readable medium of claim 15, further comprising:
receiving a query for query plan generation, optimization, and execution.

17. The non-transitory computer-readable medium of claim 16, further comprising:
in response to receiving the query, generating the query plan comprising a plurality of pipelines of operators.

18. The non-transitory computer-readable medium of claim 15, wherein the retry causes during execution of the query plan a restart of the execution of the query plan or a recompile and execution of the query plan.

19. The non-transitory computer-readable medium of claim 15, wherein the send operator is configured to check the last restart query operator to determine whether the last restart query operator is no longer able to restart execution of the query plan.

20. The non-transitory computer-readable medium of claim 19, wherein the send operator is configured to check for a change of a flag that indicates the last restart query operator is no longer able to restart execution of the query plan.

* * * * *